United States Patent
Zust

(10) Patent No.: US 11,027,192 B1
(45) Date of Patent: Jun. 8, 2021

(54) SYSTEM AND METHOD FOR AN INTERACTIVE CONTROLLER

(71) Applicant: Adam Zust, Cincinnati, OH (US)

(72) Inventor: Adam Zust, Cincinnati, OH (US)

(*) Notice: Subject to any disclaimer, the term of this patent is extended or adjusted under 35 U.S.C. 154(b) by 0 days.

(21) Appl. No.: 17/099,508

(22) Filed: Nov. 16, 2020

Related U.S. Application Data

(63) Continuation of application No. 16/798,334, filed on Feb. 22, 2020, now Pat. No. 10,835,815.

(51) Int. Cl.
*A63F 13/00* (2014.01)
*A63F 13/24* (2014.01)

(52) U.S. Cl.
CPC .................................... *A63F 13/24* (2014.09)

(58) Field of Classification Search
None
See application file for complete search history.

(56) References Cited

U.S. PATENT DOCUMENTS

| | | | | |
|---|---|---|---|---|
| 4,459,440 A * | 7/1984 | Wiczer | ............... | G05G 9/04796 200/246 |
| 5,630,756 A * | 5/1997 | Thurston | .................. | A63F 13/06 463/38 |
| 5,805,256 A * | 9/1998 | Miller | .................. | H01H 9/0235 341/22 |
| 6,327,367 B1 * | 12/2001 | Vercoe | ................. | G10H 1/0091 381/61 |
| 6,400,352 B1 * | 6/2002 | Bruneau | .................. | G09B 9/28 345/156 |
| 6,741,233 B1 * | 5/2004 | Swan | ...................... | A63F 13/06 345/161 |
| 7,407,439 B1 * | 8/2008 | Ochoa | ..................... | A63F 13/02 463/37 |
| 7,758,424 B2 * | 7/2010 | Riggs | ..................... | A63F 13/24 463/37 |
| 8,360,882 B2 * | 1/2013 | Liu | ......................... | A63F 13/06 463/37 |
| D675,555 S * | 2/2013 | Ouellette | ..................... | D12/345 |
| D698,357 S * | 1/2014 | Mainville | .................... | D14/412 |
| 8,925,414 B1 * | 1/2015 | Park | .................... | B63H 21/213 74/471 XY |
| D750,179 S * | 2/2016 | Foulkes | ....................... | D21/333 |
| 10,000,268 B1 * | 6/2018 | Poirier | ................... | H01H 9/181 |
| 2003/0058219 A1 * | 3/2003 | Shaw | ...................... | G06F 3/038 345/161 |

(Continued)

*Primary Examiner* — Paul A D'Agostino
(74) *Attorney, Agent, or Firm* — Christopher Mayle; Thomas E. LaGrandeur; Bold IP, PLLC

(57) ABSTRACT

A system and method for an interactive video game controller designed to be operated by an individual's left or right hand where the video game controller may be placed or positioned on a stable surface such as a table, the player's leg, or other level apparatus. The interactive video game controller may have a handle, shaft, and base whereby the handle may be moved relative to the base operating a directional input control. The interactive video game may also have a plurality of finger buttons on the top surface of the handle and thumb sticks on a semi-cylindrical portion of the handle so that the individual with only one hand may utilize all controls without the video game controller needed to be lifted or replaced during use or the individual needing to let go of any of the controls to interact with the other controls.

19 Claims, 8 Drawing Sheets

(56) References Cited

U.S. PATENT DOCUMENTS

| | | | |
|---|---|---|---|
| 2006/0137931 A1* | 6/2006 | Berg | B62D 1/22 180/333 |
| 2008/0186279 A1* | 8/2008 | Van Dalen | G06F 3/0338 345/163 |
| 2008/0288093 A1* | 11/2008 | Kamentser | G05G 9/047 700/85 |
| 2009/0055003 A1* | 2/2009 | Tunick | A63F 13/23 700/85 |
| 2010/0087252 A1* | 4/2010 | Tan | A63F 13/06 463/37 |
| 2010/0137105 A1* | 6/2010 | McLaughlin | A63F 13/245 482/8 |
| 2011/0172858 A1* | 7/2011 | Gustin | B63H 21/213 701/21 |
| 2012/0299829 A1* | 11/2012 | Evans | A63F 13/42 345/161 |
| 2016/0052519 A1* | 2/2016 | Martin | F16H 59/02 74/473.3 |
| 2016/0310841 A1* | 10/2016 | Offerdahl, III | A63F 13/24 |
| 2016/0317925 A1* | 11/2016 | Miller | A63F 13/98 |
| 2017/0354873 A1* | 12/2017 | Nokuo | A63F 13/837 |
| 2018/0120888 A1* | 5/2018 | Meuzelaar | G06F 3/0338 |
| 2018/0161670 A1* | 6/2018 | Boev | A63F 13/24 |

\* cited by examiner

SYSTEM AND METHOD FOR AN INTERACTIVE CONTROLLER

CROSS REFERENCE TO RELATED APPLICATIONS

This application is a continuation of U.S. patent application Ser. No. 16/798,334, filed on Feb. 22, 2020, which is incorporated by reference in its entirety.

FIELD OF THE DISCLOSURE

This disclosure relates generally to the field of interactive video game controllers and more particularly a video game controller designed to allow a person with the use of only one arm to fully grasp and manipulate the controller.

BACKGROUND

The video game industry has become larger than ever and has spawned many innovations in both software and related hardware that provide various benefits to their players. Videos have become more advanced as well and require multiple controls to fully navigate the virtual world the games take place in. Multiple controls are also important for being fully immersed in the virtual world. With numerous controls, conventional gaming controllers present a significant barrier to entry for many players. Controllers such as these often require two hands and numerous dexterous fingers are required for one to use. Those with disabilities such as amputees or individuals, who do not have sufficient control of both arms have been unable to properly play video games with conventional controllers because of their conditions. It is estimated that around 350,000 persons with amputations in USA with around 30% having upper limb loss. To give more players such as these an opportunity to operate those video games there have been controllers designed for those with disabilities. However, these controllers require the players to manipulate their hands and other body parts into awkward and uncomfortable positions or are designed to address one specific disability. Thus, there exists the need for an interactive controller suitable for many disabilities including those that are an amputee.

SUMMARY

The disclosure presented herein relates to an interactive video game controller and more particularly a video game controller designed to allow a person with the use of only one arm to fully grasp and manipulate the controller.

The present invention in some embodiments is directed to a controller for interacting with an interactive application, including: a housing having a base, a shaft extending from a first end from a ball and socket mechanism within the base, a handle extending from a second end the shaft, the handle for holding by a first hand of a player, whereby the interactive application defines a virtual environment; and whereby the handle is rotatable with respect to the ball and socket mechanism within the base for movement or viewing purposes in the virtual environment, whereby the handle is contoured to be grasped by a player's hand; the handle having a semi cylindrical portion at the rear of the handle to confront the palm of the player's hand when the handle is grasped, whereby the handle has a top wall connected to the upper edge of and has a semi cylindrical portion positioned to confront one or more fingers of the player's hand when the handle is grasped, the top wall and semi cylindrical portion connected to two side walls, whereby the top wall is substantially planar, further including one or more buttons positioned on the top wall, the one or more buttons elongated and rectangle in shape extending over a majority of the length of top wall beginning near semi cylindrical component and ending at a front wall, the front wall at an angle extending inward from the top wall to a bottom wall, the bottom wall connected to a lower edge of the semi cylindrical portion, the one or more buttons arranged in clusters of two, orientated parallel with each other, the handle having a connecting component configured to connect to the shaft, the semi cylindrical component having a circular planar surface with a thumb stick extending outward from circular planar surface 146 of semi cylindrical component, the first thumb stick positioned closer to the top wall than the bottom wall, the second thumb stick positioned lower than the first stick, the second thumb sticker closer to the sidewalls than the first stick, the base comprised of a top surface and bottom surface and a circular sidewall orientated at an angle directing outward from the from top surface to the bottom surface whereby the top edges of circular sidewall are connected to the top surface and bottom edges are connected to bottom surface, the base conical frustum in shape, the comprised of a top surface and bottom surface and a circular sidewall orientated at an angle directing outward from the from top surface to the bottom surface whereby the top edges of circular sidewall are connected to the top surface and bottom edges are connected to bottom surface, the base wider than the shaft to provide balance and stability when positioned on a surface, further including a wireless communication interface configured to transmit wireless signals representing the input received from the player.

The preceding and following embodiments and descriptions are for illustrative purposes only and are not intended to limit the scope of this disclosure. Other aspects and advantages of this disclosure will become apparent from the following detailed description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
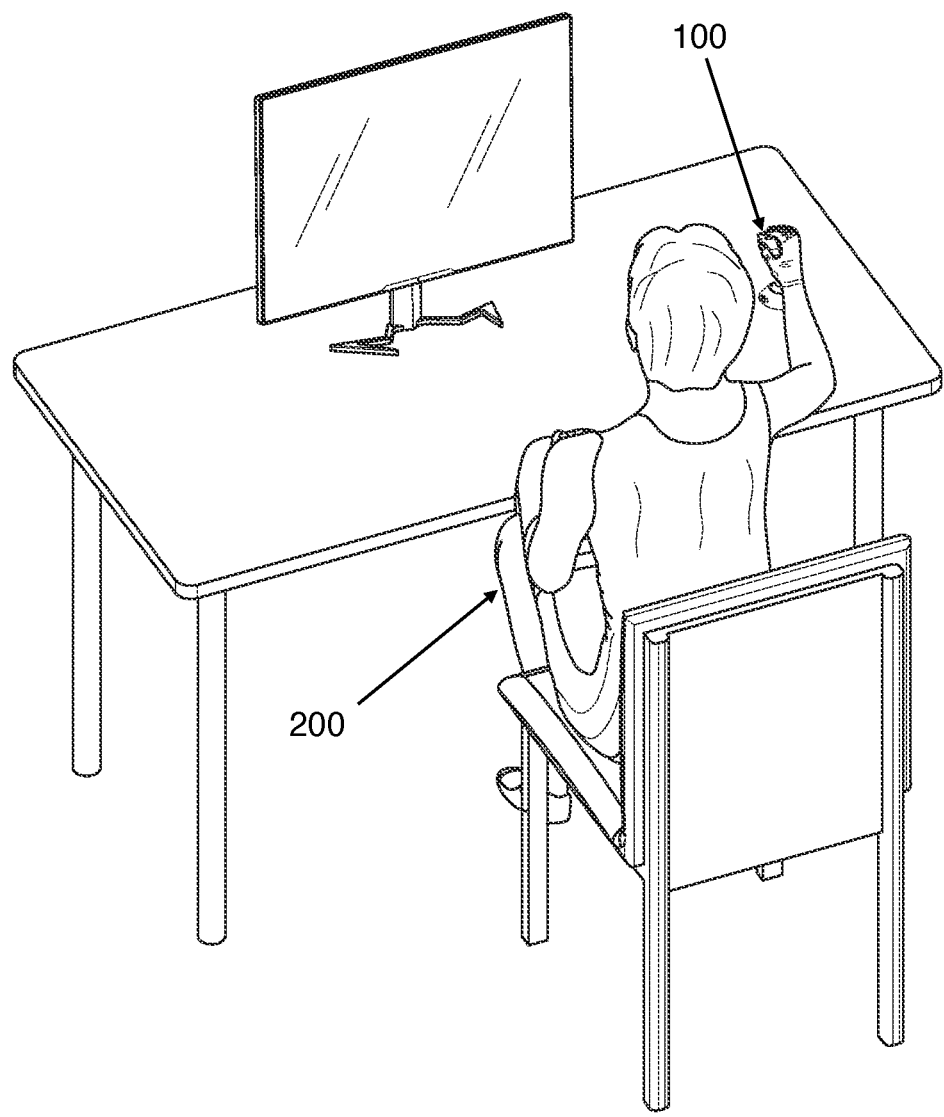
FIG. 1 is an illustration of a player operating the interactive video game controller.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose lower limit is the first number and upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present description includes one or more embodiments for an interactive video game controller designed to be operated by an individual's left or right hand whereby the video game controller may be placed or positioned on a stable surface such as a table, the player's leg, or other level apparatus and controlled without the video game controller needed to be lifted or replaced during use. Elements included herein are meant to be illustrative rather than restrictive. Persons having ordinary skill in the art relevant to the present disclosure may understand there to be equivalent elements that may be substituted with the present disclosure without changing the essential function or operation of the controller.

Interactive video game controller 100 may have a power system designed to provide energy to the circuits and components of interactive video game controller 100 during the process of operating video game controller 100. Interactive video game controller 100 may be powered by methods known by those of ordinary skill in the art. In some embodiments, interactive video game controller 100 may plug into an electrical outlet using an electrical cord to supply power to the circuits and components of interactive video game controller 100. Further, the power system may include a rechargeable battery pack whereby the rechargeable battery is of a charge, design, and capacity, to provide sufficient power to the circuits and components of interactive video game controller 100 during operation for a set period of time needed to interact with one or more video games.

In some non-limiting embodiments interactive video game controller 100 may have one or more battery compartments for receiving and holding batteries such as but not limited to AA or AAA sized conventional batteries. The battery compartment may include one or more electrodes (e.g. conventional electrodes) that are configured to contact electrically conductive surfaces of the battery received inside the compartment. The battery compartments are selectively accessible by removal of a latch cover whereby the battery compartments and the batteries are accessible only when the player removes a removable battery cover or latch mechanism concealing the battery compartment from external view. Interactive video game controller 100 may include a latch receiving component that engages with the latch cover concealing battery compartment to facilitate removal and reattachment of the latch cover from Video game controller 100.

Figure 2:
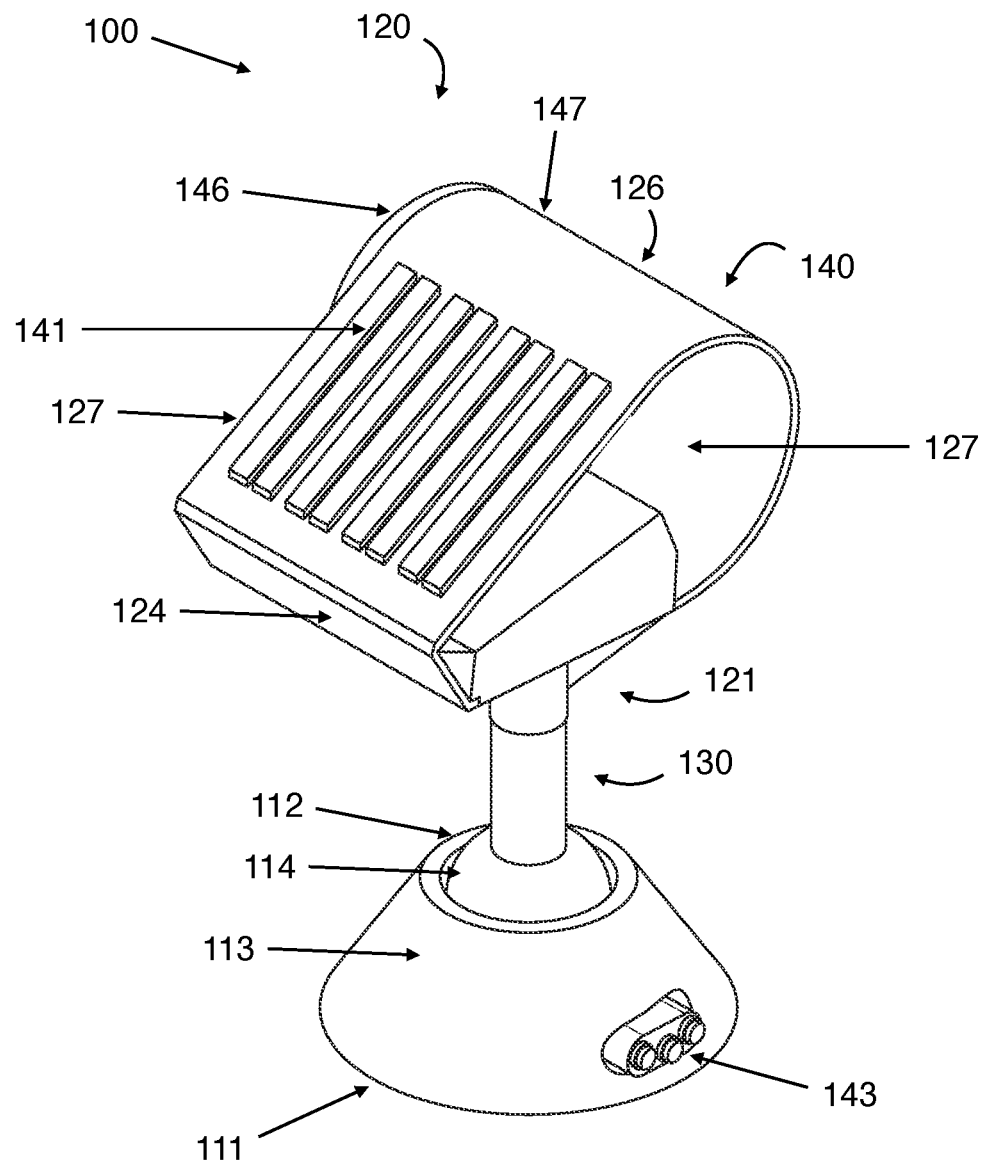
FIG. 2 is an illustration of a top perspective view of one embodiment of the interactive video game controller.
Figure 3:
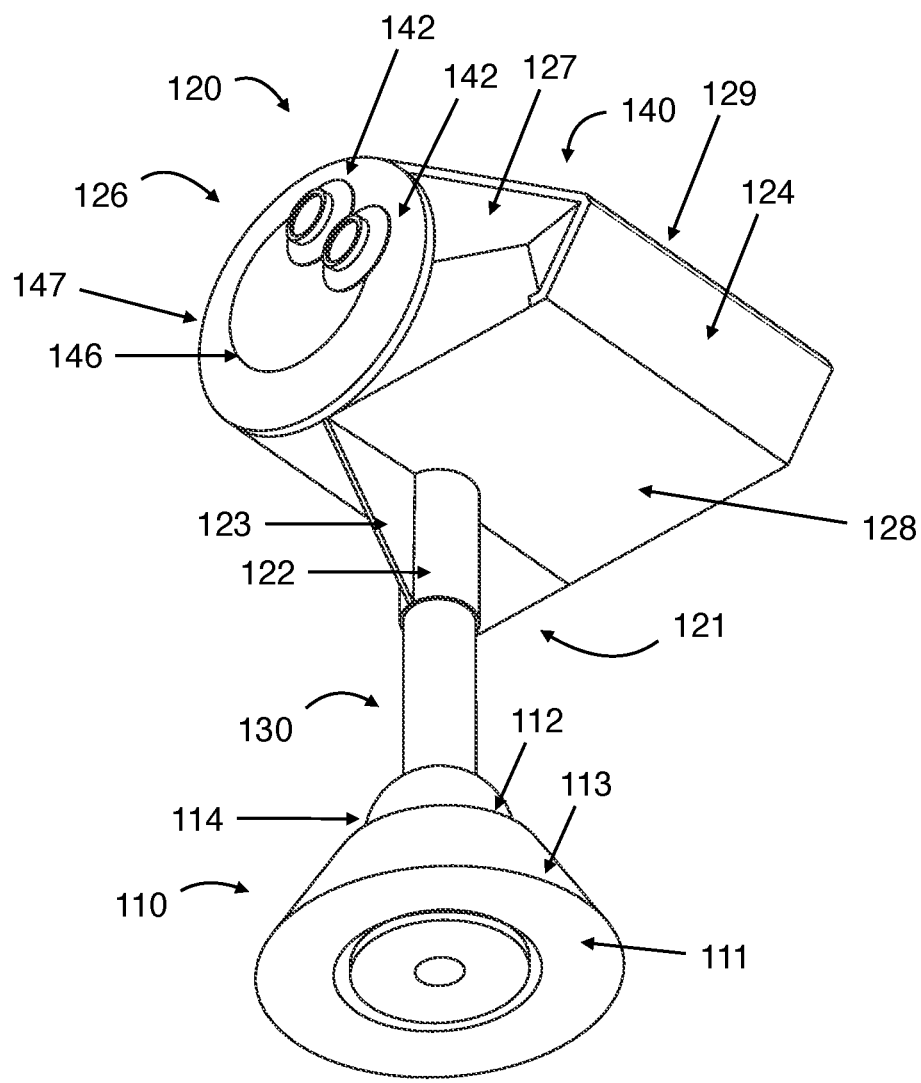
FIG. 3 is an illustration of a bottom perspective view of one embodiment of the interactive video game controller.

Turning to FIG. 1, FIG. 1 is a perspective view of a handheld interactive video game controller 100 according to an embodiment of the present invention. In this context, interactive video game controller 100 is considered to be hand-held because it is operated by hand of the player such as player 200, whether or not the entire controller is fully supported by the player's 200 hand. Interactive video game controller 100 may be used by player 200 using their left hand or right hand and is controllable from any side including from the back whereby player's 200 hand is angled upwards and from the front whereby player's 200 hand is angled downwards. Interactive video game controller 100 may have three main components, as illustrated in FIG. 2, including a base such as base 110, a handle such as handle 120, and a shaft such as shaft 130. Interactive video game controller 100 and the various components including base 110, handle 120, and shaft 130 may be made of a plastic, such as injection-molded polycarbonate (PC)/acrylonitrile butadiene styrene (ABS) or polyamide (nylon), metal, or other materials typically used in the manufacturing of video game controllers that do not stray away from the intent of the current invention. The material of interactive video game controller 100 may exhibit heat resistance, mechanical strength, or rigidity for continuous playing of interactive games without degradation or deformation of the controller.

Base 110 may be comprised of a top surface 112 and bottom surface 111 and a circular sidewall 113 orientated at an angle directing outward from top surface 112 to bottom surface 111 whereby the top edges of circular sidewall 113 are connected to top surface 112 and bottom edges are connected to bottom surface 111. With this configuration, base 110 is a conical frustum shape with circular bottom surface 111 parallel to circular top surface 112 whereby bottom surface 111 is of a larger diameter than the diameter of the top surface 112. Base 110 may be wider and have a greater circumference than handle 120 to allow for greater balance and stability for player's 200 hand movements and manipulation. Player 200 may therefore comfortably hold interactive video game controller 100 without moving the controller from the surface whereby when holding interactive video game controller 100, base 110 may support interactive video game controller 100 and the player's 200 hand's weight for continuous playing of interactive games.

Base 110 may be hollow acting as housing element for housing and holding together the components and circuitry of interactive video game controller 100. Inside of base 110 may be a ball and socket connection designed to operate as an analog stick. Ball and socket connection 114 may have a first end segment and a second end segment. An engaging end surface is present at the first end segment. The second end segment is substantially or completely hollowed out. The surface of the receiving cavity is tailored to fit the engaging end surface. In some non-limiting embodiments, a bulge may protrude from the surface of the receiving cavity to stop the movement of the engaging end surface, thus preventing over angulation or separation in the connection. The receiving cavity wall thickness and/or the engaging end surface wall thickness, are built whereby an interference fit is present after the ball and socket joint connection is linked. It should be appreciated that the ball and socket mechanism 114 may include any number of shapes, hollow areas, and sizes in various configurations and is not limited to those described above.

Utilizing ball and socket mechanism 114, handle 120 and shaft 130 are capable of motion around an indefinite number of axes, which have a common center at ball and socket mechanism 114. With this configuration, directional control similar to a thumb stick or joystick may be actuated by handle 120, which transfers the motion via shaft 130 leading down to ball and socket mechanism 114. Ball and socket mechanism 114 may be connected to one or more switches that are connected to a circuit board which sends these signals to the microprocessor, which compares that data with the instructions in the game software for that specific input from the directional movement of handle 120 in relation to base 110, and triggers the appropriate response.

In some embodiments, base 110 may have one or more compartments capable of holding one or more weights to increase the weight of base 110, as preferred by player 200. In another embodiment, the one or more compartments can optionally be empty, for example, if player 200 prefers a lighter controller 100.

Shaft 130 may have a main body that is tubular in shape with an upper first end and lower second end, the upper first end connected to handle 120 and lower second end connected to base 110. Shaft 130 may be connected to base 110 by ball and socket mechanism 114 whereby the lower distal end of shaft 130 is directly connected to a receptacle on ball and socket mechanism 114. Shaft 130 may be permanently attached to ball and socket mechanism 114 or removably attached. Shaft 130 may have a treaded male component on the lower second end whereby shaft 130 may be screwed into a threaded female receptacle in ball and socket mechanism 114. In other non-limiting embodiments, shaft 130 may have snug-fit, snap-fit, or clamp connection with ball and socket mechanism 114 or be connected by any method known by those of ordinary skill in the art.

Handle 120 may have a connecting component 121 for shaft 130 to attach upon. Connecting component 121 may have a tubular slot 122 functioning as the receiving component for shaft 130 whereby shaft 130 may be inserted into tubular slot 122. In some embodiments, slot 122 may have a treaded female component whereby a male threaded component of shaft 130 may be screwed into the female receptacle tubular slot 122. In other non-limiting embodiments, slot 122 may have snug-fit, snap-fit, or clamp connection with shaft 130 or be connected by any method known by those of ordinary skill in the art.

Figure 4:
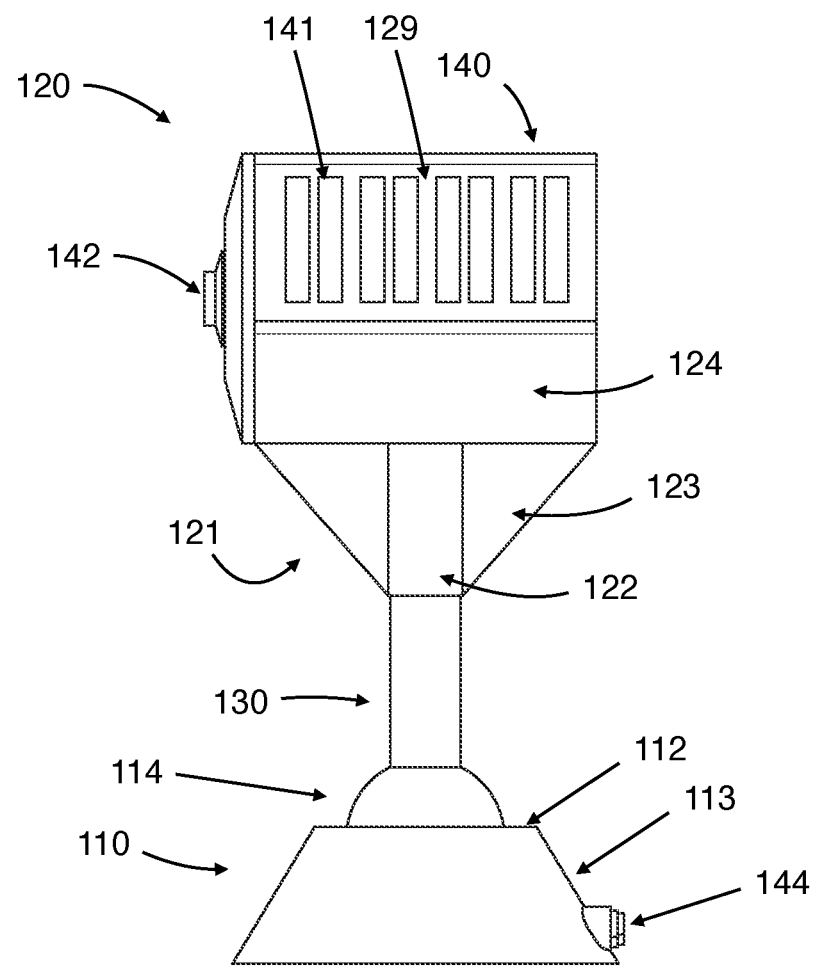
FIG. 4 is a front view of one embodiment of the interactive video game controller.
Figure 5:
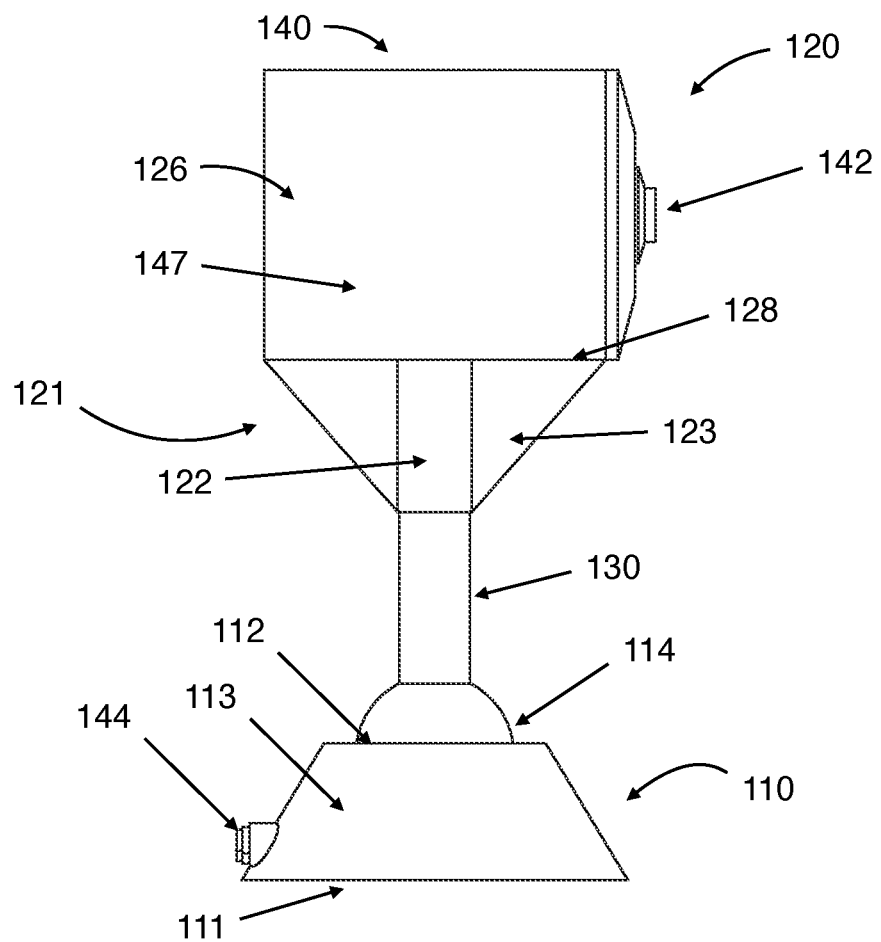
FIG. 5 is a back view of one embodiment of the interactive video game controller.

Handle 120 may be shaped and dimensioned to be grasped by player's 200 individual hand such that player 200 may manipulate or interact with interactive video game controller 100 from a single position. Handle 120 may be ergonomically contoured such that player's 200 hand can comfortably grasp interactive video game controller 100. For example, as illustrated in FIG. 4, handle 120 may have a semi cylindrical component 126 having the shape of a longitudinal part of a cylinder having two fully circular planar surfaces 146 at each end of curved surface 147. Semi cylindrical component 126 may operate as bend or curve to receive player's 200 palm such that the palm of player 200 rests naturally along the semi cylindrical component 126.

Curved surface 147 of semi cylindrical component 126 may be comprised of gripping surface material or any adhesive whereby the material prevents slippage between the palm of player 200 and interactive video game controller 100. The coverage area of the material may be an externally applied adhesive coating or the material may be impregnated within the curved surface 147 itself.

Circular planar surfaces 146 of semi cylindrical component 126 may extend outward into a pair of symmetrical side walls 127 that are formed on the left and right sides of the semi cylindrical component 126; and a plate-shaped bottom wall 128 and top wall 129 whereby bottom wall 128 protrudes at an angle upward from the lower front edge of semi cylindrical component 126 and top wall 129 protrudes at an angle downward from the upper edge of semi cylindrical component 126. Sidewalls 127, bottom wall 128, and top wall 129 may terminate at a front wall 124 relatively opposite of semi cylindrical component 126. From semi-cylindrical component 126, top wall 129 extends past bottom wall 128 when terminating at front wall 124 giving front wall 124 a downward retracting angle to the center of handle 120 and semi-cylindrical component 126.

Top wall 129 may include a plurality of finger buttons 141 that extend outward from top wall 129 whereby when player's 200 hand is positioned on handle 120 of handle 120 with player's 200 palm resting on semi-cylindrical component 126, the fingers of player 200 may rest upon on top wall 129 to interact with finger buttons 141 with little to no movement during gameplay. Finger buttons 141 may be pressed by an index, middle, ring, or pinky finger of player's 200 hand or a combination of both. Finger buttons 141 may have a spring mechanism or compressible material under finger buttons 141 bias to the original position of finger buttons 141 protruding from top wall 129 whereby the spring mechanism or compressible material stops the finger buttons 141 from staying down when pushed and pushes finger buttons 141 back up when player 200 releases finger buttons 141.

In the illustrated embodiment, finger buttons 141 are elongated and rectangle in shape extending over much of the length of top wall 129 beginning near semi-cylindrical component 126 and ending at front wall 124. Finger buttons 141 may be made of rubber or plastic. Finger buttons 141 may have the form other shapes such as but not limited to, elliptical or circular. Finger buttons 141 may be arranged in clusters or groups of two, totaling four groups for eight controls in total. In this embodiment, finger buttons 141 are orientated parallel with each other. In other non-limiting embodiments, finger buttons 141 may be orientated such that they converge towards the an edge of top wall 129 with respect to each other.

Labeling of finger buttons 141 may vary depending on which console, system, or device the controller is intended for such as but not limited to "A B X Y LB RB LT RT", "A B Y X L R ZL ZR" or "Cross, Circle, Triangle, Square, LB, RB, LT, RT". Finger buttons 141 may provide a signal for interacting, grasping, pushing, lifting, etc., of virtual objects in an interactive video game.

Finger buttons 141 may be connected to one or more switches that are connected to a circuit board which sends these signals to the microprocessor which compares that data with the instructions in the game software for that specific input of the pressing of the finger buttons 141 and triggers the appropriate response.

Circular planar surfaces 146 of semi-cylindrical component 126 may include a plurality of multifunctional controls or thumb sticks 142 that extend outward from circular planar surfaces 146 of semi cylindrical component 126. Thumb sticks 142 are designed to normally control movement and viewing (camera angles or first-person perspective view) of an avatar and are intended to be operated by player 200. In the illustrated embodiment, a first thumb stick 142 may be positioned near top wall 129 with second thumb stick positioned lower and closer to sidewall 127. When player's 200 hand is positioned on handle 120 of handle 120 with player's 200 palm resting on semi-cylindrical component 126, player's 200 thumb (i.e., the first finger) is comfortably positionable above circular planar surfaces 146 of semi cylindrical component 126 with the thumb engaging on thumb sticks 142. Thumb sticks 142 may have a spring-based mechanism or be inherently resilient, whereby they return to an unbiased central position when not under force by player 200.

The placement of finger buttons 141 on top wall 129 and thumb sticks 142 on circular planar surface 146 of semi cylindrical component 126 remove the need for player 200 to remove their thumb from the thumb sticks in order to operate additional actions controlled by finger buttons 141. This is an improvement over existing controllers which require player 200 to remove his or her right thumb from the right thumb stick to operate finger buttons 141. This takes time and can cause a loss of control, especially in video games that require jumping and aiming.

In other non-limiting embodiments, direction pads, depressible in four different directions (e.g., up, down, left, and right), may replace or work in conjunction with thumb sticks 142 or finger buttons 141. The direction pads are intended to be operated by one of player's 200 thumbs, typically either as an alternative to the thumb sticks or for three directional movement and viewing and/or to provide additional actions similar to finger buttons 141 for interactive games with multiple controls needed.

Thumb sticks 142 may be connected to one or more switches that are connected to a circuit board which sends these signals to the microprocessor which compares that data with the instructions in the game software for that specific input of the pressing of thumb sticks 142 and triggers the appropriate response.

Figure 7:
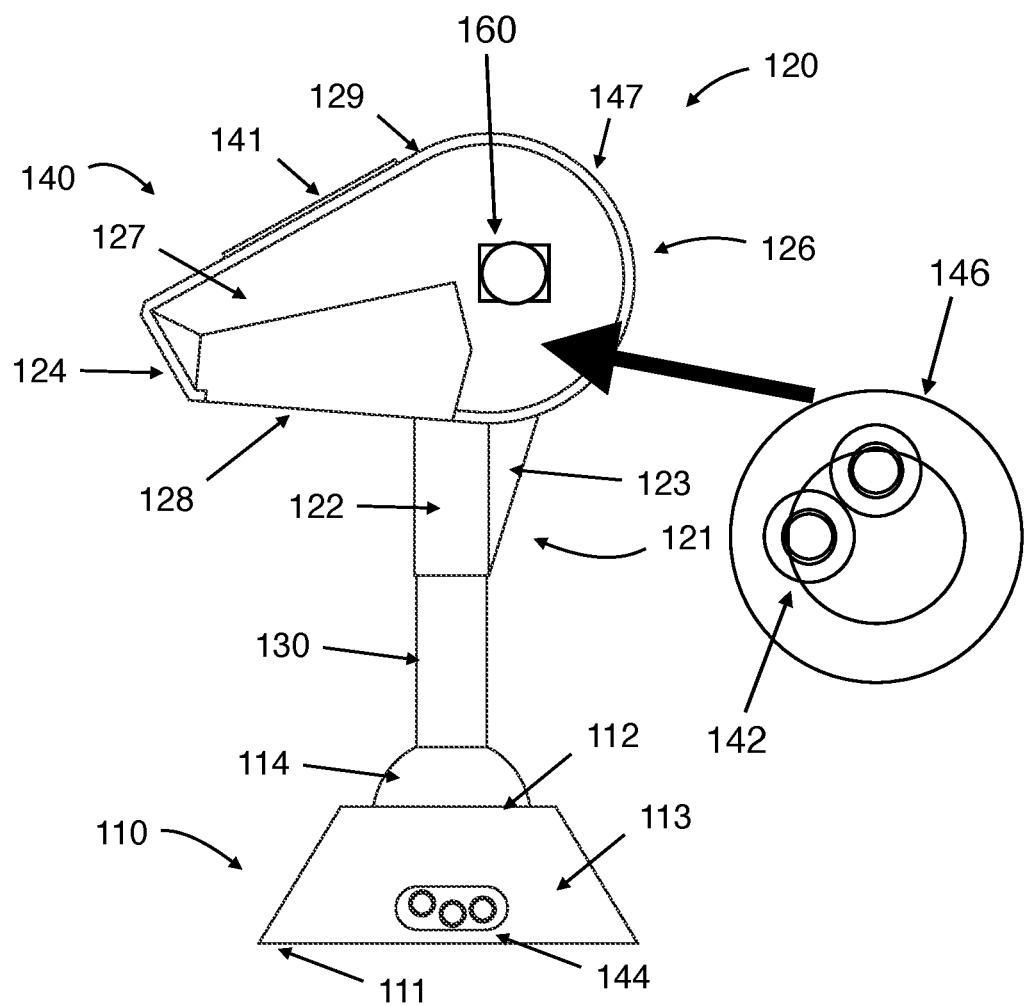
FIG. 7 is a view of a mounting platform onto interactive video game controller.

In some non-limiting embodiments, circular planar surface 146 may be removably affixed to sidewall 127 and opposite side of handle 120 via a mounting platform 160 without the use of any tools, as illustrated in FIG. 7. This is beneficial for players that only have a left hand or right hand whereby the circular planar surface 146 and thumb sticks 142 may be placed on both sides of handle 120 so that interactive video game controller 100 is ambidextrous and suitable for both types of player's needs. Circular planar surfaces 146 of semi cylindrical component 126 may have a corresponding mounting platform configured to interface with mounting platform 160 of handle 120. Mounting platform 160 may include a top side having a retention interface configured to interface with and mate with a mounting interface of circular planar surface 146.

Mounting platform 160 may include any suitable surface, feature, shape, and/or structure configured to selectively mate with the mounting interface of circular planar surface 146. For example, the mounting interface of mounting platform 160 may have a shape that complements a shape of an accessory-retention interface of circular planar surface 146. In some embodiments there may be multiple exchangeable circular planar surfaces 146 with different configurations so that thumb sticks 142 may be in different positions and orientations. Circular planar surfaces 146 may also be rotatable and connected to mounting platform 160 at different angles so thumb sticks 142 may be at similar positions on both sides of handle 120.

Figure 6:
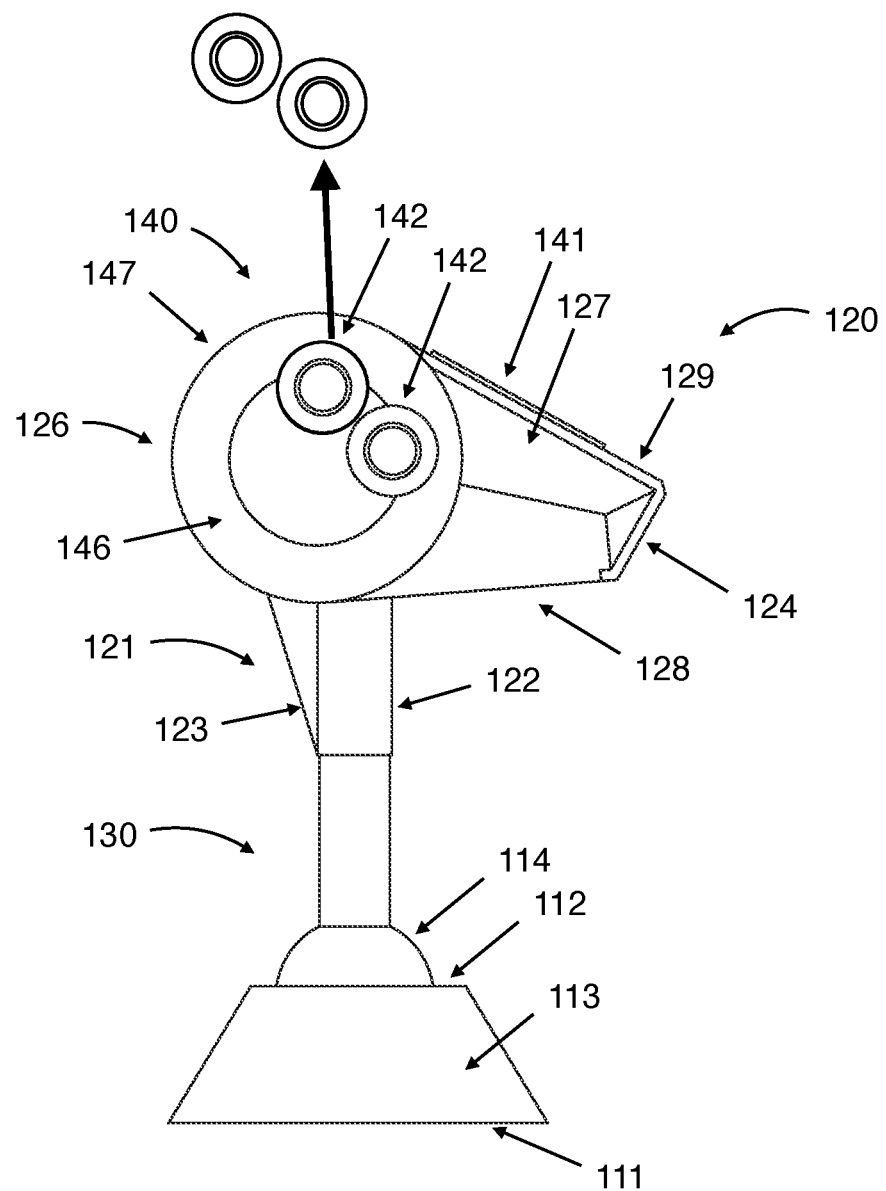
FIG. 6 is a view of removable thumb sticks onto interactive video game platform.

In some non-limiting embodiments, thumb sticks 142 may be removably affixed to either circular planar surfaces 146 of semi cylindrical component 126 whereby player 200 may removably affix various removable controller accessories such as thumb sticks 142 to interactive video game controller 100 without the use of any tools as illustrated in FIG. 6. This is beneficial for players that only have a left hand or right hand whereby the thumb sticks 142 may be removed and replaced on both sides of circular planar surfaces 146 of semi cylindrical component 126 so that interactive video game controller 100 is ambidextrous and suitable for both types of player's needs.

Circular planar surfaces 146 of semi cylindrical component 126 may have a mounting platform configured to interface with a selected removable controller accessory such as a thumb stick 142. The mounting platform may include a topside having an accessory-retention interface configured to interface with and mate with a mounting interface of thumb stick 142. The mounting platform may include any suitable surface, feature, shape, and/or structure configured to selectively mate with the mounting interface of thumb stick 142 to removably affix the removable thumb sticks 142 to interactive video game controller 100. For example, the mounting interface of thumb stick 142 may have a shape that complements a shape of an accessory-retention interface of the mounting platform.

Figure 8:
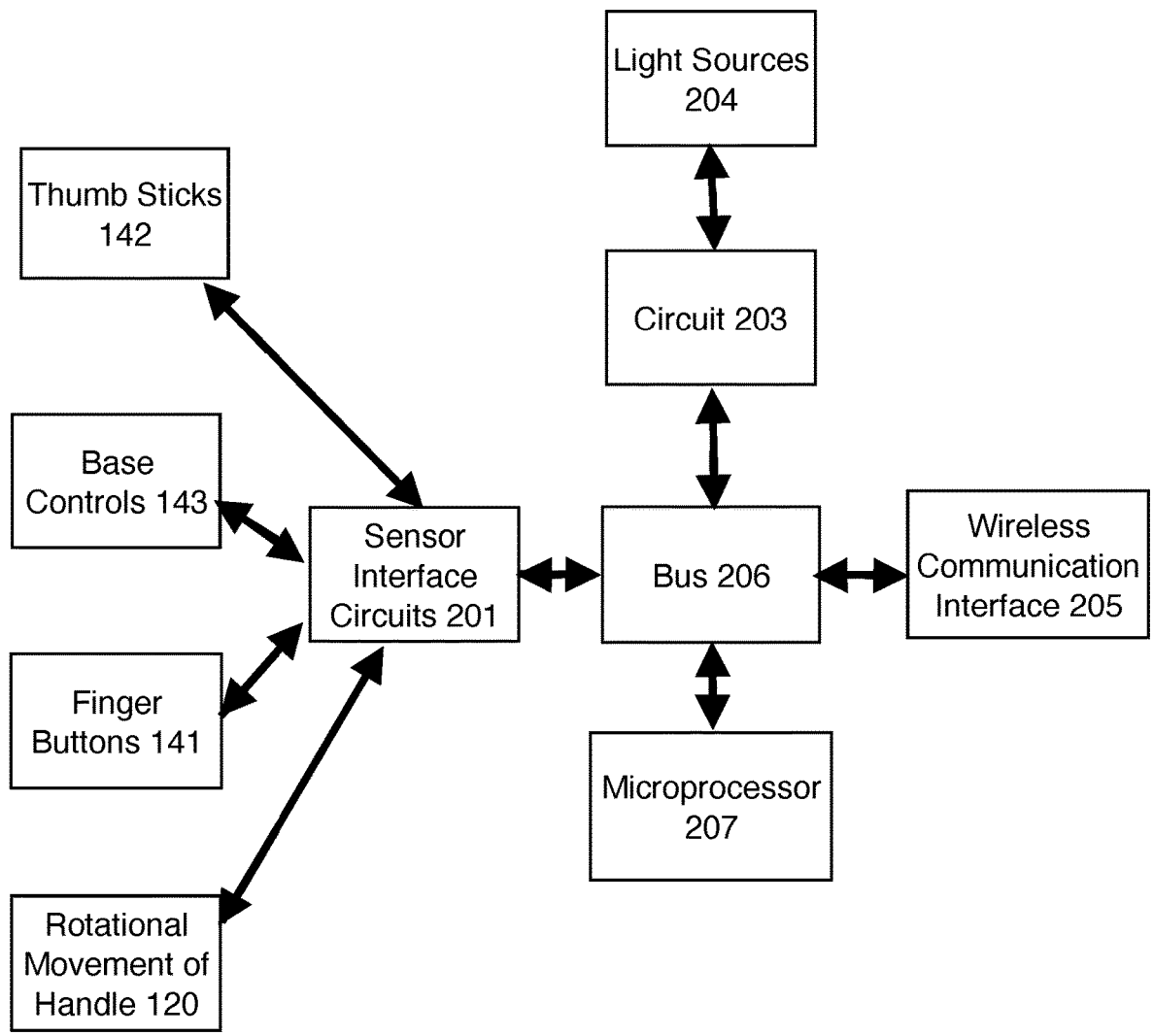
FIG. 8 is a block diagram of the components of the interactive video game controller.

FIG. 8 is an example schematic block diagram of interactive video game controller 100, in accordance with an embodiment. Interactive video game controller 100 includes finger buttons 141, base controls 143, thumb sticks 142, and rotational movement of handle 120 in relation to base 110, one or more sensor interface circuits 201, light sources 204, a circuit 203, a wireless communication interface 205, a bus 206, and a microprocessor 207. The sensor interface circuit 201 may be a digital, analog, or mixed-signal circuit to receive sensor signals in the form of voltage or current from finger buttons 141, base controls 143, thumb sticks 142, and rotational movement of handle 120 in relation to base 110, when they are interacted with by player 200. Finger buttons 141, base controls 143, thumb sticks 142, and rotational movement of handle 120 in relation to base 110, generates sensor signals responsive to being pressed by the finger or thumb of player 200. In some embodiments, the controls may be connected to a transducer that converts the mechanical motion of the controls into the sensor signals.

Interactive video game controller 100 may include circuit 203 to provide electrical signals, such as voltage, to light sources 204. Circuit 203 may be powered by the power system of interactive hand-held controller 100 to generate the electrical signals. Light sources 204 emit the light responsive to receiving the electrical signals received. Interactive video game controller 100 may include wireless communication interface 205, which may be a digital, analog, or mixed-signal circuit to transmit wireless signals indicating player input received from player's 200 hand. The wireless signals may be transmitted to another device such as a video game console, a computer, a wearable device, tablet, mobile computing device head-mounted display, a computer, a virtual reality system, etc. Wireless communication interface 205 may send and receive data via a wireless network without the need for connecting cables to interactive hand-held controller 100.

Wireless communication interface 205, sensor interface circuits 201, and circuit 203 may communicate via bus 206. Bus 206 may communicate with microprocessor 207 which compares data with the instructions in the game software for specific input from finger buttons 141, base controls 144, thumb sticks 142, and rotational movement of handle 120 in relation to base 110, and triggers the appropriate response. Each of the controls may be configured to activate a corresponding electronic input sensor to generate an activate control signal responsive to players acting upon them. For example, each control signal associated with a control may be mapped to an interactive video game operation. Different video games may have different mappings of control signals to operations. In some cases, each action button may be mapped to a different operation. In other cases, two action buttons may be mapped to a same operation.

In one or more non-limiting embodiments, interactive video game controller 100 may have one or more vibration motors (e.g., rumble motors, eccentric rotating mass vibration motors) that can be selectively actuated by a signal communicated to interactive video game controller from a separate device such as a video game console to provide vibration feedback to parts of interactive video game controller 100 (e.g., provide vibration feedback to handle 120).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A controller for interacting with an interactive application, comprising:
   a base;
   a shaft extending from a first end from the base; and
   a handle extending from a second end of the shaft, the handle for holding by a first hand of a player, wherein the handle is contoured to be grasped by a player's hand; wherein the handle is rotatable with respect to the base for movement or viewing in a virtual environment, the handle having a planar surface, the planar surface having one or more controls, wherein the planar surface is a mounting platform, the mounting platform removably connected to the handle, the mounting platform attachable to opposite sides of the handle.

2. The controller of claim 1, wherein the interactive application defines a virtual environment; and wherein the handle is rotatable with respect to the ball and socket mechanism within the base for movement or viewing in the virtual environment.

3. The controller of claim 1, the base comprised of a top surface and bottom surface and a circular sidewall orientated at an angle directing outward from the from top surface to the bottom surface wherein the top edges of the circular sidewall are connected to the top surface and the bottom edges are connected to the bottom surface.

4. The controller of claim 1, the first planar surface and the second planar surface on the sides of the handle.

5. The controller of claim 3, wherein the handle is a top surface having one or more elongated buttons.

6. The controller of claim 5, the one or more buttons arranged in clusters of two, orientated parallel with each other.

7. The controller of claim 1, further comprising a wireless communication interface configured to transmit wireless signals representing the input received from the player.

8. The controller of claim 1, the base wider than the shaft to provide balance and stability when positioned on a surface.

9. The controller of claim 1, the handle having a connecting component configured to connect to the shaft, the connecting component having a tubular receiving slot for receiving the shaft.

10. The controller of claim 5, wherein the top wall is substantially planar.

11. A controller for interacting with an interactive application, comprising:
    a base;
    a shaft extending from a first end of the base; and
    a handle extending from a second end of the shaft, the handle for holding by a first hand of a player, wherein the handle is contoured to be grasped by a player's hand; wherein the handle is rotatable with respect to the base for movement or viewing in a virtual environment, the handle having a planar surface, the planar surface having a first multifunctional control and second thumb multifunctional for one or more actions in the virtual environment, wherein the planar surface is a mounting platform, the mounting platform removably connected to the handle, the mounting platform attachable to opposite sides of the handle.

12. The controller of claim 11, wherein the interactive application defines a virtual environment; and wherein the handle is rotatable with respect to the ball and socket mechanism within the base for movement or viewing in the virtual environment.

13. The controller of claim 11, the base comprised of a top surface and bottom surface and a circular sidewall orientated at an angle directing outward from the from top surface to the bottom surface wherein the top edges of the circular sidewall are connected to the top surface and the bottom edges are connected to the bottom surface.

14. The controller of claim 11, the planar surface on the side of the handle.

15. The controller of claim 14, the handle having a top wall with one or more buttons.

16. The controller of claim 15, the one or more buttons arranged in clusters of two, orientated parallel with each other.

17. The controller of claim 11, further comprising a wireless communication interface configured to transmit wireless signals representing the input received from the player.

18. The controller of claim 13, the base wider than the shaft to provide balance and stability when positioned on a surface.

19. A controller for interacting with an interactive application, comprising:
   a planar surface, the planar surface having a plurality of controls, wherein the planar surface is a mounting platform, the mounting platform removably connected to the controller, wherein the mounting platform is attachable to opposite sides of the controller.

* * * * *